Dec. 23, 1930.  T. H. THOMAS ET AL  1,786,178
ELECTROPNEUMATIC BRAKE
Filed Feb. 21, 1929
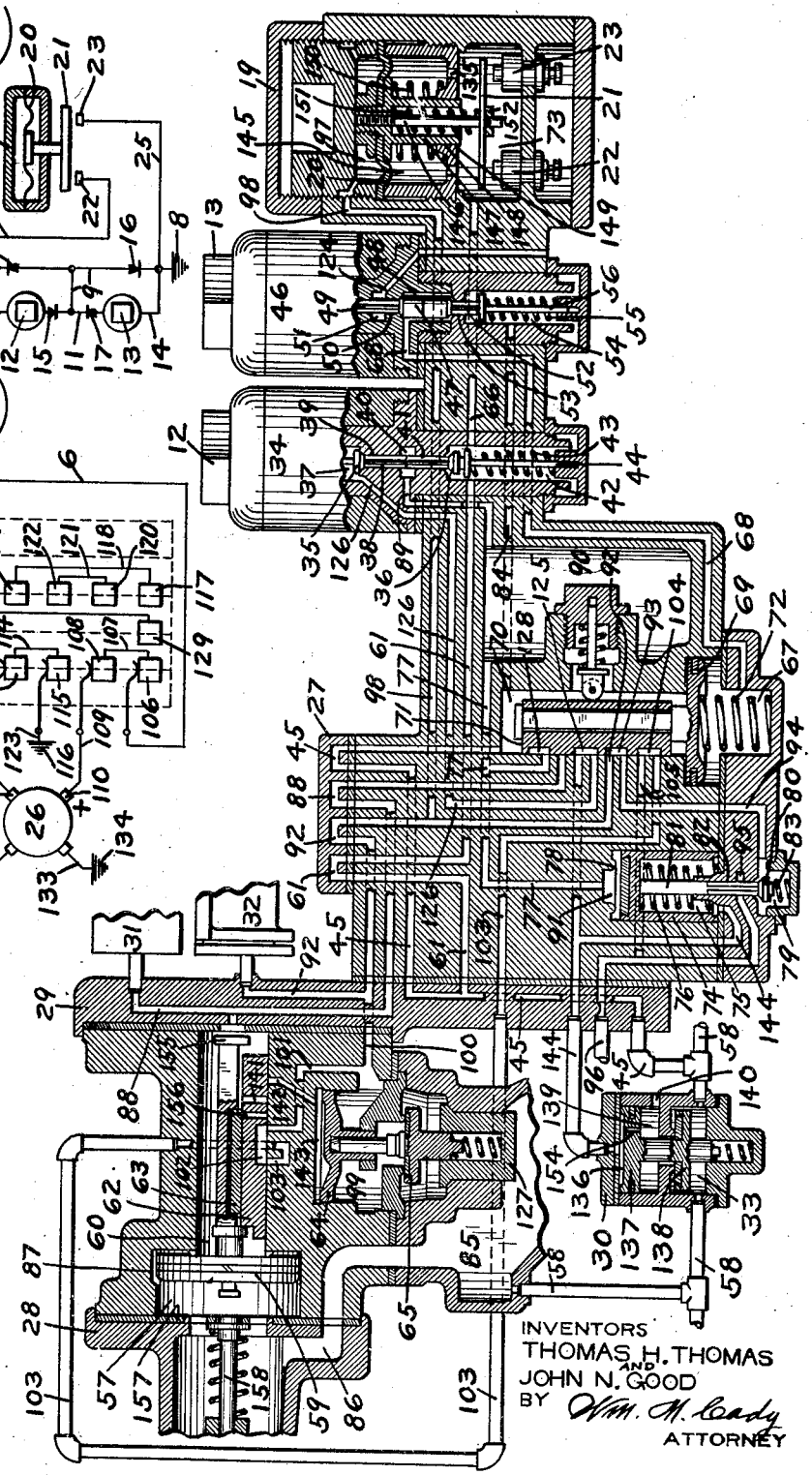
INVENTORS
THOMAS H. THOMAS
AND
JOHN N. GOOD
BY *Wm. M. Cady*
ATTORNEY Patented Dec. 23, 1930

1,786,178

UNITED STATES PATENT OFFICE

THOMAS H. THOMAS, OF EDGEWOOD, AND JOHN N. GOOD, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed February 21, 1929. Serial No. 341,603.

This invention relates to electro-pneumatic brakes, and more particularly to a brake equipment for electrically controlling the brakes on the cars of a train.

An object of the invention is to provide an improved electro-pneumatic brake equipment of the type in which the brakes are controlled by current flow through a single train wire.

Another object of the invention is to provide an electro-pneumatic brake equipment in which a ruptured air hose, or the like, will cause an application of the brakes to be effected.

Another object of the invention is to provide an improved electro-pneumatic brake equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view of an electro-pneumatic brake equipment embodying the invention; and Fig. 2 is a diagrammatic section of the electro-pneumatic valve mechanism employed on each car of the train in connection with the equipment shown in Fig. 1.

Referring to the drawing, the controlling vehicle of the train is provided with a brake switch device 5, shown developed in Fig. 1, which switch device is adapted to control the operation of magnet valve devices 12 and 13 provided on each vehicle of the train and connected to a train wire 6, leading from the brake switch device 5.

One terminal of the magnet valve device 12 is connected to the train wire 6 by a wire 7, while the other terminal of said magnet valve device is connected to a ground 8 by a wire 9. The wire 9 is connected to the train wire 6 by a wire 10.

On the other hand, one terminal of the magnet valve device 13 is connected to the wire 9 by a wire 11, while the other terminal of said magnet valve device is connected to the ground 8 by a wire 14.

Associated with the magnet valve devices 12 and 13, are rectifiers 15, 16, 17 and 18. The rectifiers 15 and 16 are arranged in the local circuit of the magnet valve device 12 for permitting flow of current only in one direction, as indicated by the arrows, while the rectifiers 17 and 18 are arranged in the local circuit of the magnet valve device 13 for permitting flow of current therethrough only in one direction, the reverse of the permitted current flow through the magnet valve device 12.

A pneumatically operated emergency switch device 19 is associated with the magnet valve devices 12 and 13. Said switch device has a contact 22 which is connected to the train wire 6 by a wire 24, and a contact 23 which is connected to the ground 8 by a wire 25.

A plate 21, which is normally held disengaged from the contacts 22 and 23, is adapted to be moved into engagement with the contacts 22 and 23, so as to short circuit the magnet valve devices 112 and 13 for a purpose to be hereinafter described.

The plate 21 is carried by the lower end of a rod 146 depending from a diaphragm 20 mounted in the casing of the switch device 19. The diaphragm 20 also carries a tubular plunger 147 which surrounds the upper portion of the rod 146 and is slidably mounted in a bore 148 of a cage 149.

The cage 149 contains a spring 150 which bears at one end against the diaphragm 20 so as to maintain the same in the upper position, as shown in Fig. 2.

Encircling the rod 146 is a spring 151 which maintains the plate 21 against a washer or stop member 152 on the end of the rod 146 when the diaphragm 20 is in the upper position. However, when the diaphragm 20 is moved downwardly, in the manner to be hereinafter described, and the plate 21 engages the contacts 22 and 23, the diaphragm 20 and the rod 146 and plunger 147 are permitted to continue to move downwardly, compressing the springs 150 and 151, and thereby forcing the plate 21 tightly against the contacts 22 and 23.

The electric equipment of the controlling vehicle of the train includes a generator 26 adapted to supply direct current to the train wire 6 when the brake switch device 5 is in the running and service positions, and alternating current to the train wire 6 when said brake switch device is in the lap position.

The magnet valve devices 12 and 13, and the emergency switch device 19 may be secured to a selector valve portion 27 of the brake equipment on each vehicle of the train. This brake equipment may also comprise a triple valve device 28 which is mounted on a bracket 29, on which is also mounted said selector valve portion 27. Also connected to the bracket 29 are a vent valve device 30, an auxiliary reservoir 31, and a brake cylinder 32.

The magnet valve device 12 may comprise a magnet 34 and valves 35 and 36 adapted to be operated by said magnet. The valve 35 is contained in a chamber 37, while the valve 36 is contained in a chamber 42. Valve 35 has a fluted stem 38 extending through a suitable bore 39 in the casing and engaging in a chamber 40, a fluted stem 41 of the valve 36. A spring 43, contained in chamber 42, acts on a collared stem 44 in engagement with valve 36, tending to seat said valve and unseat the valve 35.

The magnet valve device 13 comprises a magnet 46 and a double beat valve 47 contained in a chamber 48 and adapted to be operated by said magnet. The double beat valve 47 has at one side, a fluted stem 49 extending through a suitable bore 50 in the casing and through a chamber 51, and at the opposite side, a fluted stem 52 extending through a suitable bore 53 in the casing into a chamber 54.

The chamber 54 contains a spring 55 acting on a collared stem 56 in engagement with the valve stem 52, thereby tending to seat the double beat valve 47 in the upper position, as shown in Fig. 2 of the drawing.

The triple valve device 28 may comprise the usual casing, having a piston chamber 57 connected to the brake pipe 58 and containing a piston 59 and a valve chamber 60, connected to the auxiliary reservoir 31 by a passage and pipe 88 and containing a main slide valve 62 and a graduating slide valve 63 adapted to be operated by piston 59.

The quick action portion of the triple valve device may comprise the usual piston 64 for operating a train pipe vent valve 65.

The selector valve portion 27 comprises a casing having a chamber 67 connected through a passage 68 to the chamber 48 and containing a piston 69, and a valve chamber 70 containing a slide valve 71 adapted to be operated by said piston.

A spring 72 in piston chamber 67 tends to maintain the piston 69 and slide valve 71 in their normal position, as shown in Fig. 2.

Contained in a bore in the casing of the selector valve portion 27, is an emergency release valve device comprising a valve piston 74, having at one side a chamber 75 containing a spring 76 for urging said valve piston toward a seat ring 78 formed in the casing.

Contained in a chamber 79, is a tappet valve 80, having at one side, a fluted stem 81 extending through a bore 82 in the casing and into chamber 75. A spring 83, in chamber 79, acts on the head of the valve 80, tending to seat said valve. When the valve piston 74 is in the position shown in Fig. 2, the head thereof engages the end of the valve stem 81, thereby unseating said tappet valve, for a purpose to be hereinafter described.

In operation, the brake pipe 58 is charged with fluid under pressure through the usual brake valve device (not shown), which device is operated independently of the brake switch device 5.

Fluid under pressure then flows from the brake pipe 58 to the triple valve piston chamber 57 through chamber 85 and passage 86 in the triple valve device 28, and shifts the piston 59 and slide valves 62 and 63 to the release position, as shown in Fig. 2. In this position, fluid under pressure flows from piston chamber 57 through feed groove 87 to valve chamber 60 and thence through passage and pipe 88 to the auxiliary reservoir 31.

Fluid under pressure also flows from the brake pipe 58 to the vent valve piston chamber 33 and through pipe and passage 45 to the selector slide valve chamber 70, and also through passage 61 to chamber 42 in the magnet valve device 12, and from thence through a passage 66 to chamber 73 of the emergency switch device 19. The fluid under pressure in chamber 73 then flows through openings 135 in the cage 149 to chamber 145, within the cage, and shifts the diaphragm 20 to its upper position, thereby disengaging the plate 21 from the contacts 22 and 23. From the selector slide valve chamber 70, fluid under pressure flows through a passage 84 to the double beat valve spring chamber 54, and thence through passage 53, chamber 48, and passage 68 to the selector valve piston chamber 67. Since the pressure of the fluid in chambers 70 and 67 will be substantially equal, spring 72 will maintain the piston 69 and the slide valve 71 in the normal position, as shown in Fig. 2.

When the triple valve piston 59 and the main slide valve 62 are in release position, the brake cylinder 32 will be vented to the atmosphere through pipe and passage 92, passage 100, quick action piston chamber 99, passage 101, cavity 102 in the main slide valve 62, passage and pipe 103, cavity 104 in the slide valve 71, and passages 105 and 96.

With the brake switch 5 in the running position shown in Fig. 1, the train wire 6 is connected to the positive pole 110 of the direct current winding of the generator 26 by way of switch contact 106, wire 107, switch contact 108 and wire 109. The circuit is then completed through the negative pole 111 of the generator 26, the wire 112, switch contact 113, wire 114, switch contact 115 and ground 116, the train wire 6 being connected to the ground 8, in the manner previously described.

When the positive pole of the direct current winding of the generator 26 is connected to the train wire 6, current flows through the rectifiers 15 and 16 and the magnet 34 of the magnet valve device 12, but the rectifiers 17 and 18 prevent the flow of current in this direction to the magnet 46 of the magnet valve device 13. Thus the magnet 34 becomes energized while the magnet 46 remains deenergized.

With the magnet 46 deenergized, the double beat valve 47 is seated in the upper position by spring 55, thereby permitting fluid under pressure to flow from the spring chamber 54 through valve chamber 48 and passage 68 to the selector valve piston chamber 67, in the manner heretofore described.

With the magnet 34 of the magnet valve device 12 energized, the valve 35 is seated and the valve 36 is unseated, so that fluid under pressure flows from the chamber 42 to chamber 40 and from thence through passage 89 to an emergency application chamber 90, thereby charging said chamber.

Fluid under pressure flows from the emergency application chamber 90, through passage 77 to a chamber 91 in the casing on the side of the valve piston 74 opposite the chamber 75, thereby building up a pressure in the chamber 91 and forcing the valve piston 74 downwardly, unseating the tappet valve 80.

With the tappet valve 80 unseated, as shown in Fig. 2, the brake cylinder 32 will also be vented to the atmosphere through pipe and passage 92, cavity 93 in the slide valve 71, passage 94, chamber 79, bore 82, chamber 95, and passage and pipe 96. Chamber 97 of the emergency switch device 19 is also at atmospheric pressure, due to the connection through passage 98 with pipe and passage 92.

If it is desired to electrically effect a service application of the brakes, the brake switch 5 is moved to service position, in which a circuit is completed from the ground 8 through the train wire 6, contact 117 of the brake switch, wire 118, contact 119, and wire 112 to the negative pole 111 of the generator direct current winding, through the direct current winding of the generator to the positive pole 110 of the generator, and thence through wire 109, contact 120, wire 121, contact 122 and wire 123 to the ground 116.

With the negative pole 111 of the direct current winding of the generator 26 connected to the train wire 6, current flows through the magnet 46 of the magnet valve device 13 and rectifiers 17 and 18 in the opposite direction from that in running position, so that the rectifiers 15 and 16 prevent the flow of current in this direction, and consequently the magnet 34 is deenergized, while the magnet 46 is energized.

Energization of the magnet 46 seats the double beat valve 47 in its lower position and closes communication between chambers 48 and 54 and connects chamber 48 to chamber 51.

Fluid under pressure from selector valve piston chamber 67 is then vented to the atmosphere through passage 68, double beat valve chamber 48, and chamber 51 to the atmospheric exhaust passage 124, which permits the fluid pressure in valve chamber 70 to shift the selector valve piston 69 and slide valve 71 downward to service position, against the pressure of spring 72.

With the slide valve 71 in service position, the brake cylinder exhaust passage 94 will be lapped, and passage 92 is connected by valve cavity 125 to passage 126 leading to valve chamber 37.

With the magnet 34 deenergized, the valve 36 is seated and the valve 35 is unseated by the pressure of spring 43, so that fluid under pressure is permitted to flow from the auxiliary reservoir 31 to the brake cylinder 32, through pipe and passage 88, valve cavity 128, passage 77, chamber 90, passage 89, chamber 40, passage 39, magnet valve chamber 37, passage 126, valve cavity 125, and passage and pipe 92.

If it is desired to limit the degree of brake cylinder pressure obtained in a service application of the brakes, when the desired brake cylinder pressure is obtained, the brake switch 5 is moved to lap position, in which a circuit is completed through the train wire 6, contact 129 of the brake switch, thence through wire 130, contact 131, wire 132, the alternating current winding of the generator 26 and through wire 133 to the ground 134, the train wire 6 being grounded at 8, in the manner heretofore referred to.

The alternating current then supplied to the train wire 6 passes through the rectifiers 15, 16, 17 and 18 and magnets 34 and 46, thereby energizing both magnets.

The magnet 46 being energized in lap position of the brake switch maintains the double beat valve 47 and the selector piston 69 and slide valve 71 in service position. The magnet 34 being energized, the valve 35 is seated and the valve 36 unseated, so that further flow of fluid under pressure to the brake cylinder is prevented.

The brake cylinder pressure may be increased in steps as desired by alternately moving the brake switch between service and lap positions, as will be evident.

The brakes may be released by moving the brake switch 5 to running position in which the positive pole 110 of the direct current winding of the generator 26 is connected to the train wire 6, thereby causing the magnet 34 to be energized and the magnet 46 to be deenergized, as hereinbefore described.

Deenergization of magnet 46 permits the pressure of spring 55 to shift the double beat valve 47 to its upper position and permit the flow of fluid under pressure from spring chamber 54 to the selector piston chamber 67. The piston 69 and slide valve 71 are then shifted to release position in which the brake cylinder is connected to the atmosphere through passage and pipe 96.

If the brake switch 5 is left in running position the brakes will be fully released, but if it is desired to effect a graduated release of the brakes, the brake switch may be moved from running to lap position, in which the alternating current is supplied to the train wire 6 which operates the magnets 34 and 46 to prevent any further change in brake cylinder pressure, the same as in graduating the application. Thus, by alternately moving the brake switch between running and lap position, the brake cylinder pressure may be reduced in steps as desired.

To effect an emergency application of the brakes, the brake switch is moved to emergency position in which the train wire circuit is opened, which causes both magnets 34 and 46 to be deenergized.

The deenergization of magnet 46 operates to maintain the selector piston 69 and slide valve 71 in inner or upper position. The deenergization of magnet 34 permits the valve 36 to be seated and the valve 35 to be unseated by the pressure of spring 43.

Unseating valve 35 permits the fluid under pressure in the normally charged chamber 90 to flow to emergency release valve piston chamber 75, through passage 89, chamber 40, passage 39, valve chamber 37, passage 126, valve cavity 125, and passage 144, thereby equalizing the pressures of the fluid on both sides of the valve piston 74, and permitting the spring 76 to seat the valve against the seat ring 78. With the valve piston 74 thus seated, the spring 83 will force valve 80 to its seat, thereby cutting off the atmospheric connection from the brake cylinder 32.

Fluid will also flow from passage 144 to chamber 136 of the vent valve device 30, thereby forcing piston 137 downwardly, unseating valve 138.

The fluid under pressure in the brake pipe 58 then flows from chamber 33 to chamber 139 and thence through opening 140 to the atmosphere to effect a sudden local reduction in brake pipe pressure in the usual manner.

Furthermore, the fluid under pressure in the chambers 145 and 73 of the emergency switch device 19 will flow through passage 66, chamber 42, and passages 61 and 45 to the chamber 33, and thence past unseated valve 138 to chamber 139 and through opening 140 to the atmosphere.

When the pressure of the fluid in chambers 145 and 73 is reduced a predetermined amount, the pressure of the fluid in chamber 97 will force the diaphragm 20 downwardly, engaging the plate 21 with the contacts 22 and 23, in the manner heretofore described.

When the brakes are released by moving the switch 5 from the emergency to the running position, fluid under pressure from the brake pipe 58 will be again built up in chambers 73 and 145 and the parts of the emergency switch device 19 will be returned to their normal positions, as shown in Fig. 2. However, as will be hereinafter described, the plate 21 is adapted to be automatically actuated to engage the contacts 22 and 23 so as to short circuit the magnet valve devices 12 and 13 should certain conditions arise.

The sudden local reduction in brake pipe pressure causes the triple valve piston 59 to be quickly shifted to emergency position, in which the emergency port 141 registers with the brake cylinder passage 101, so that the fluid under pressure in the auxiliary reservoir 31 is permitted to equalize into the brake cylinder, and apply the brakes in emergency. Also in this position, passage 142 is uncovered by the end of the main slide valve 62, thereby allowing fluid pressure from the auxiliary reservoir to flow into chamber 143 and operate the quick action piston 64, so as to unseat the vent valve 65. When the valve 65 is unseated, fluid under pressure from the brake pipe 58 will lift the check valve 127 so as to permit the fluid from the brake pipe 58 to flow to the brake cylinder 32, thereby causing a local reduction in brake pipe pressure in order to transmit emergency action in the usual well known manner.

To effect the release of the brakes after an emergency application, the brake pipe 58 is supplied with fluid under pressure in the usual manner, the fluid flowing to the triple valve piston chamber 57 through chamber 85 and passage 86, and shifts the piston 59 and slide valves 62 and 63 to the release position, as shown in Fig. 2. With the parts of the triple valve device 28 in the release position, the brake cylinder 32 will be vented to the atmosphere through pipe and passage 92, passage 100, quick action piston chamber 99, passage 101, cavity 102 in the main slide valve 62, passage and pipe 103, cavity 104 in the slide valve 71, and passages 105 and 96, and the auxiliary reservoir 31, vent valve piston chamber 33, selector slide valve chamber 70, selector valve piston chamber 67, and chambers 73 and 145 of the emergency switch device 19 will be charged with fluid under pressure in the manner heretofore described. The fluid under pressure in chambers 73 and 145 will force the diaphragm 20 to its upper position, thereby disengaging the plate 21 from the contacts 22 and 23. The switch 5 may be moved from the emergency to the running position.

It should be noted that since the emergency action is caused by opening the train wire circuit, that if the train wire becomes broken or the supply of current fails, an emergency application of the brakes will be automatically effected in the same manner as described above.

When the brake pipe pressure is suddenly reduced by the bursting of a flexible hose between the cars, or otherwise, the sudden local reduction in brake pipe pressure causes the triple valve piston 59, to be quickly shifted to emergency position, in which the emergency port 141 registers with the brake cylinder passage 101, so that the fluid under pressure in the auxiliary reservoir 31 is permitted to equalize into the brake cylinder 32, and apply the brakes in emergency.

It may be necessary to control the brakes pneumatically, as for example, when engines are changed and the train is operated by an engine not equipped for electric control, or where electrically equipped vehicles are connected in a train with vehicles not so equipped.

When the brakes are controlled pnuematically and no current is supplied to the train wire 6 by the generator 26, the magnets 34 and 46 will be deenergized.

With the magnet 34 deenergized, the valve 36 is seated by the pressure exerted by spring 43 and the valve 35 is unseated. Therefore, chamber 91 on the upper side of the valve piston 74 will be vented to the atmosphere through passage 77, emergency application chamber 90, passage 89, chamber 40, passage 39, chamber 37, passage 126, cavity 125 in the slide valve 71, passage and pipe 144, chamber 136 of the vent valve device 30, port 154 in the piston 137, chamber 139, and opening 140.

With the chamber 91 vented to the atmosphere in the manner just described, spring 76 will force the valve piston 74 against the seat ring 78, thereby permitting spring 83 to seat valve 80. Therefore, when the brakes are controlled pneumatically, the atmospheric vent from the brake cylinder 32 through pipe and passage 92, cavity 93 in the slide valve 71, passage 94, chamber 79, passage 82, chamber 95, and passage 96, will be shut off by the seated valve 80. However, as hereinbefore described, the brake cylinder 32 will be vented to the atmosphere through pipe and passage 92, passage 100, quick action piston chamber 99, passage 101, cavity 102 in the main slide valve 62 of the triple valve device 28, passage and pipe 103, cavity 104 in the slide valve 71, and passages 105 and 96.

With the triple valve device in the release position as shown in Fig. 2 and with the equipment fully charged with fluid under pressure from the brake pipe 58, if it desired to effect a service application of the brakes, the brake pipe pressure is reduced in the usual manner, and consequently the pressure in the chamber 57 is reduced to the same extent.

As the pressure of the fluid in the valve chamber 60 will then exceed the pressure of the fluid in the piston chamber 57, piston 59 will be moved to the left toward the usual service position and communication from the piston chamber 57 to the valve chamber 60 through the feed groove 87 will be cut off.

After the triple valve piston 59 has thus been moved a predetermined amount, a shoulder 155 on the piston stem will engage the main slide valve 62 and consequently the main slide valve will also be moved to the left by the triple valve piston 59.

When the main slide valve 62 is moved to the left, port 156 will register with passage 101, and thus fluid under pressure which is supplied to the chamber 60 from the auxiliary reservoir 31 through pipe and passage 88, will flow to the brake cylinder 32 through passage 101, quick action piston chamber 99, passage 100, and passage and pipe 92, thereby effecting a service application of the brakes in the usual manner. When the port 156 registers with the passage 101, the fluid will quickly flow from the valve chamber 60 to the brake cylinder 32. In this way a sudden local reduction of brake pipe pressure is produced, thereby causing the usual quick service action to be propagated serially throughout the train.

When a sudden reduction in brake pipe pressure is made to effect an emergency application of the brakes, piston 59 will be shifted quickly to the left, engaging the seat 157 and compressing the spring stop 158. In this movement, the main slide valve 62 will be moved to connect passage 141 with passage 101 and the fluid in the auxiliary reservoir 31 will flow to the brake cylinder 32 in the manner heretofore described, thus effecting the usual emergency application of the brakes.

While one illustrative embodiment of our invention has been described in detail, it is not our intention to limit its scope to this embodiment or otherwise than by the terms of the appended claims.

Having now described our invention, what we claim as new and desire to secure by Letters Patent, is:—

1. An electro-pneumatic brake having a single train wire, means for supplying either direct or alternating current to the train wire, magnet valve devices connected to said train wire and controlled according to the direction of current in said wire for controlling the service application and release of the brakes, and an electro-pneumatically actuated switch mechanism for short circuiting said magnet valve devices for effecting an emergency application of the brakes.

2. An electro-pneumatic brake having a single train wire, a brake switch device having a running position in which current flowing in one direction is supplied to said train wire, and a brake application position in which alternating current is supplied to said train wire, magnet valve devices connected to said train wire and controlled according to the direction of current in said wire for controlling the application and release of the brakes, pneumatically operated valve means for effecting an emergency application of the brakes, and an electro-pneumatically operated switch for short circuiting said magnet valve devices for effecting an emergency application of the brakes.

3. An electro-pneumatic brake having electrically controlled means for effecting a service application of the brakes and including a magnet valve device having a control circuit and electrically controlled means for controlling the release of the brakes and including a magnet valve device having a control circuit, pneumatically operated valve means for effecting an emergency application of the brakes, and means for actuating said emergency valve means and including an electro-pneumatic device electrically connected with said magnet valve devices.

4. In an electrically controlled brake, the combination with two electrically controlled devices for controlling the brakes and means whereby current is supplied to one device in one direction to effect a service application of the brakes, of means for short circuiting both of said devices to effect an emergency application of the brakes.

5. In an electro-pneumatic brake, the combination with a plurality of electrically controlled devices for controlling the brakes and means whereby current supplied to one device in one direction will effect a service application of the brakes, of a pneumatically actuated emergency valve device, and means for short circuiting said electrically controlled devices and for actuating said valve device to effect an emergency application of the brakes.

6. In an electro-pneumatic brake, the combination with electrically controlled means for effecting a service application of the brakes and electrically controlled means for controlling the release of the brakes, of a pneumatically actuated emergency valve device, and electro-pneumatically controlled means connected to the control circuits of both the electrically controlled service and release means and controlling the operation of said valve device for effecting an emergency application of the brakes.

7. In an electro-pneumatic brake, the combination with a brake cylinder and a valve device for controlling the communication through which fluid under pressure is supplied to the brake cylinder, two electrically controlled devices adapted to control the communication between the valve device and the brake cylinder for effecting a service application and release of the brakes, an electro-pneumatic device connected to the communication between the brake cylinder and said valve device and adapted to short circuit said electrically controlled devices, means for actuating said electro-pneumatic device, and an additional valve device operable when said electro-pneumatic device is actuated for controlling the rate at which fluid under pressure is admitted to the brake cylinder whereby an emergency application of the brakes is effected.

8. In an electro-pneumatic brake, the combination with a single train wire and a plurality of electrically controlled means operated by current supplied from said train wire for controlling the brakes, of means for short circuiting said electrically controlled means including an electro-pneumatic device having a fluid pressure sensitive diaphragm, a contact plate carried by said diaphragm, and a plurality of contact members, each contact member being connected to one of said electrically controlled means and normally disconnected from said contact plate.

9. In an electro-pneumatic brake, the combination with a single train wire and a plurality of electrically controlled means operated by current supplied from said train wire for controlling the brakes, of means for short circuiting said electrically controlled means including an electro-pneumatic device having a fluid pressure sensitive diaphragm, a contact plate carried by said diaphragm, a plurality of contact members, each contact member being connected to one of said electrically controlled means and normally disconnected from said contact plate, and means for actuating said electrically controlled means for effecting the operation of said electro-pneumatic device.

10. In an electro-pneumatic brake, the combination with a brake cylinder and a brake pipe in communication with said brake cylinder, of means for controlling the communication through which fluid under pressure is supplied to and released from the brake cylinder, electrically controlled means for operating said fluid controlling means, a valve for also cutting off the communication through which fluid is released from the brake cylinder, and pneumatically operated means actuated by said electrically controlled means for operating said valve.

In testimony whereof we have hereunto set our hands, this 18th day of February, 1929.

THOMAS H. THOMAS.
JOHN N. GOOD.